(12) United States Patent
Gendler et al.

(10) Patent No.: US 12,099,597 B2
(45) Date of Patent: *Sep. 24, 2024

(54) APPARATUS AND METHOD FOR POWER VIRUS PROTECTION IN A PROCESSOR

(71) Applicant: Intel Corporation, Santa Clara, CA (US)

(72) Inventors: Alexander Gendler, Kiriat Motzkin (IL); Sagi Meller, Zichron Yaakov (IL); Gavri Berger, Haifa (IL); Igor Yanover, Yokneam Illit (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,996

(22) Filed: Oct. 30, 2023

(65) Prior Publication Data

US 2024/0061928 A1 Feb. 22, 2024

Related U.S. Application Data

(63) Continuation of application No. 16/728,843, filed on Dec. 27, 2019, now Pat. No. 11,809,549.

(51) Int. Cl.
  *G06F 21/00* (2013.01)
  *G06F 1/32* (2019.01)
  (Continued)

(52) U.S. Cl.
  CPC ............... *G06F 21/54* (2013.01); *G06F 1/32* (2013.01); *G06F 9/3802* (2013.01); *G06F 21/561* (2013.01); *G06F 2221/034* (2013.01)

(58) Field of Classification Search
  None
  See application file for complete search history.

(56) References Cited

U.S. PATENT DOCUMENTS

| | | | |
|---|---|---|---|
| 8,527,994 B2 * | 9/2013 | Bose | ................... G06F 9/5094 713/300 |
| 9,383,806 B2 * | 7/2016 | Lien | ....................... G06F 1/324 |

(Continued)

OTHER PUBLICATIONS

Tenentes, Vasileios et al. Run-time Detection and Mitigation of Power-Noise Viruses. 2019 IEEE 25th International Symposium on On-Line Testing and Robust System Design (IOLTS). https://ieeexplore.ieee.org/stamp/stamp.jsp?tp=&arnumber=8854375 (Year: 2019).*

(Continued)

*Primary Examiner* — Jeremiah L Avery
(74) *Attorney, Agent, or Firm* — NICHOLSON DE VOS WEBSTER & ELLIOTT LLP

(57) ABSTRACT

An apparatus and method for intelligent power virus protection in a processor. For example, one embodiment of a processor comprises: first circuitry including an instruction fetch circuit to fetch instructions, each instruction comprising an instruction type and an associated width comprising a number of bits associated with source and/or destination operand values associated with the instruction; detection circuitry to detect one or more instructions of a particular type and/or width; evaluation circuitry to evaluate an impact of power virus protection (PVP) circuitry when executing the one or more instructions based on the detected instruction types and/or widths; and control circuitry, based on the evaluation, to configure the PVP circuitry in accordance with the evaluation performed by the evaluation circuitry.

20 Claims, 16 Drawing Sheets

(51) Int. Cl.
*G06F 9/38* (2018.01)
*G06F 21/54* (2013.01)
*G06F 21/56* (2013.01)

(56) References Cited

U.S. PATENT DOCUMENTS

| | | | | |
|---|---|---|---|---|
| 10,678,912 B2* | 6/2020 | Mestha | ............... | H04L 67/12 |
| 2003/0125922 A1* | 7/2003 | Grochowski | ......... | G06F 1/3296 |
| | | | | 703/18 |
| 2014/0380338 A1* | 12/2014 | Makovsky | ............ | G06F 1/3206 |
| | | | | 719/318 |
| 2015/0261270 A1* | 9/2015 | Vikinski | ................ | G06F 1/28 |
| | | | | 713/300 |
| 2019/0205244 A1* | 7/2019 | Smith | ................. | G06F 3/065 |

OTHER PUBLICATIONS

Ravikumar, C.P. et al. A hierarchical approach to self-test, fault-tolerance and routing security in a Network-on-Chip. 019 IEEE International Test Conference India (ITC India). https://ieeexplore.ieee.org/stamp/stamp.jsp?tp=&arnumber=8979997 (Year: 2019).*

Kimmitt, et al., "A Toolchain for Safety-Critical Embedded Processor Programming using FPGAs", 2015 IEEE 13th International Conference on Industrial Informatics (INDIN), Available online at <https://ieeexplore.ieee.org/stamp/stamp.jsp?tp=&arnumber=7281847>, 2015, pp. 848-855.

Non-Final Office Action, U.S. Appl. No. 16/728,843, Mar. 16, 2023, 22 pages.

Notice of Allowance, U.S. Appl. No. 16/728,843, Jul. 17, 2023, 10 pages.

Qayyum, et al., "Hardware Devices Security, their Vulnerabilities and Solutions", 2018 15th International Bhurban Conference on Applied Sciences and Technology (IBCAST), Available online at <https://ieeexplore.ieee.org/stamp/stamp.jsp?tp=&arnumber=8312261>, 2018, pp. 439-445.

* cited by examiner

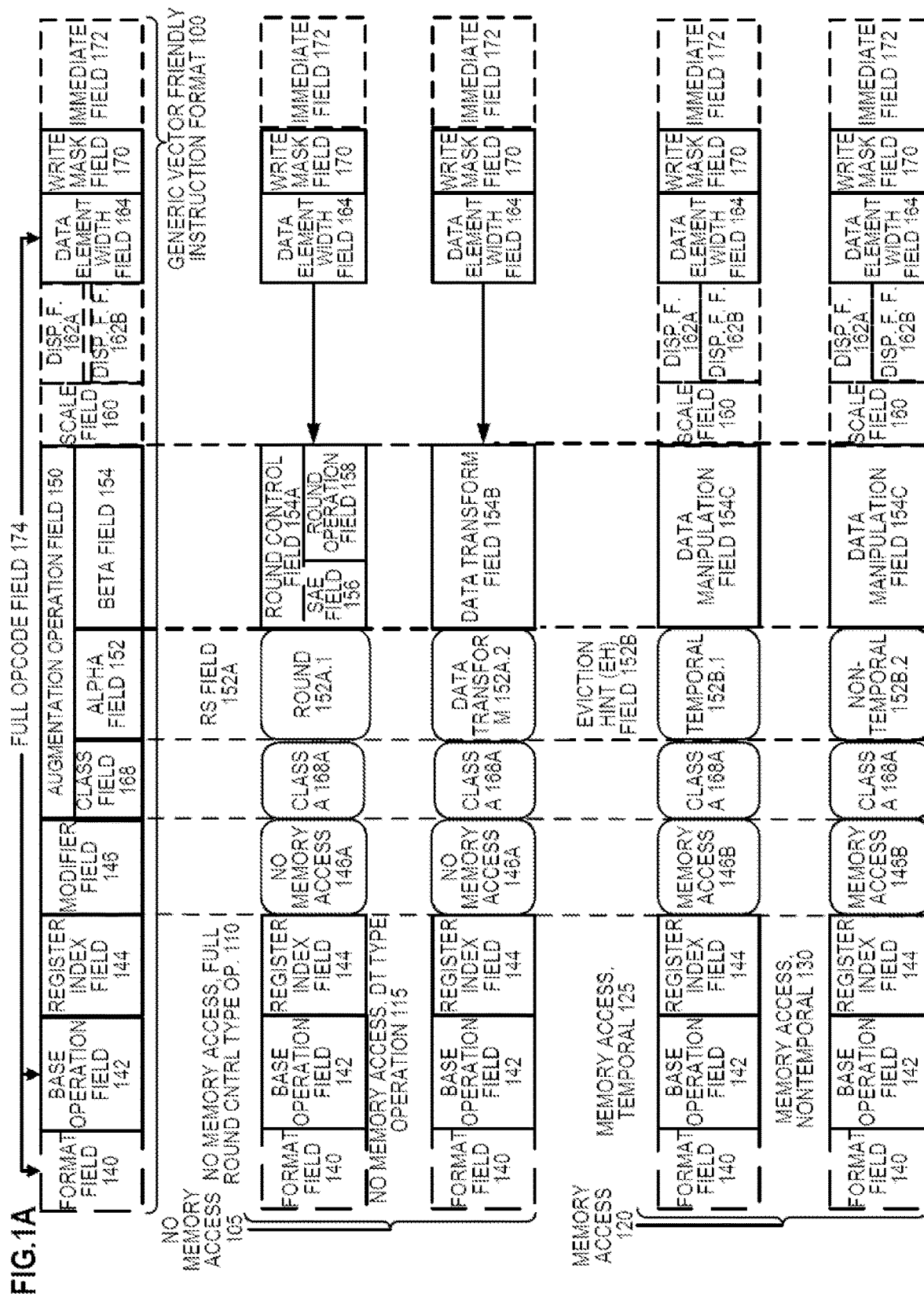

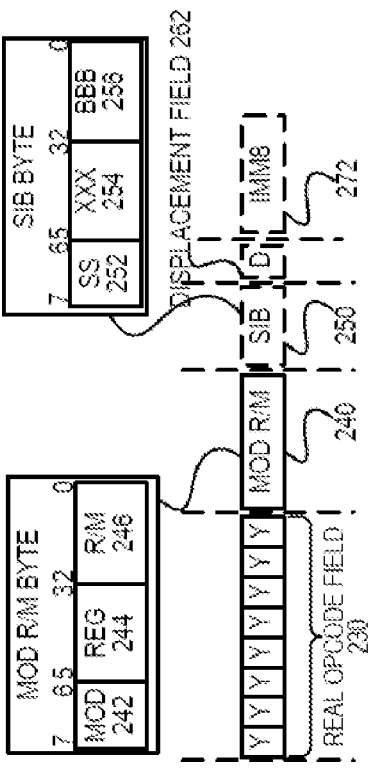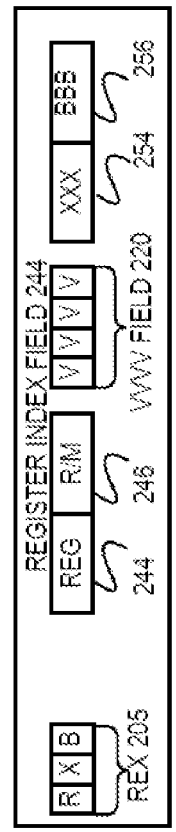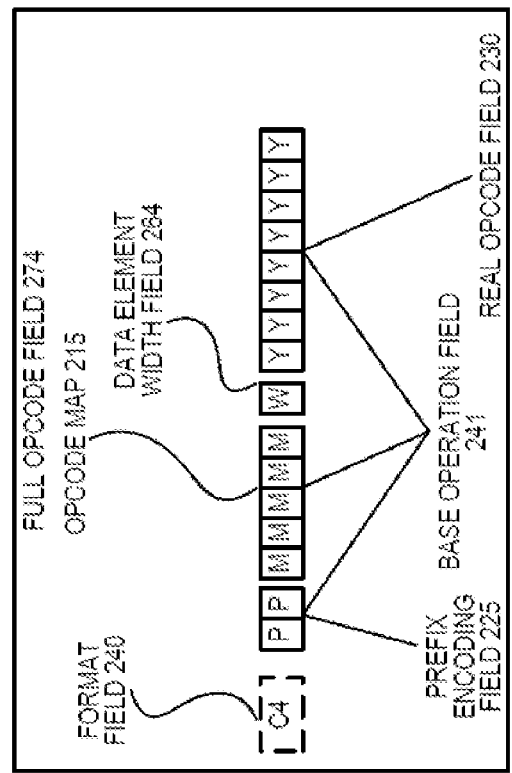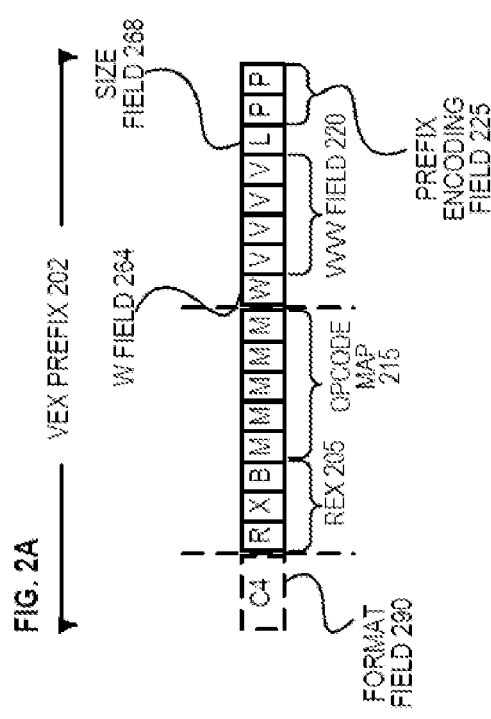

FIG. 3
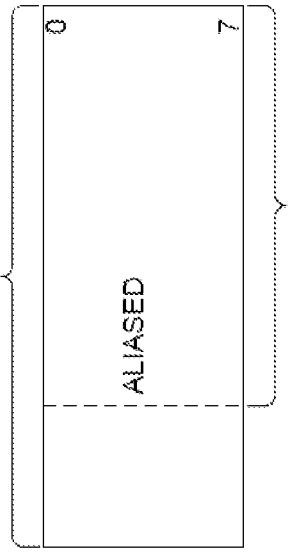
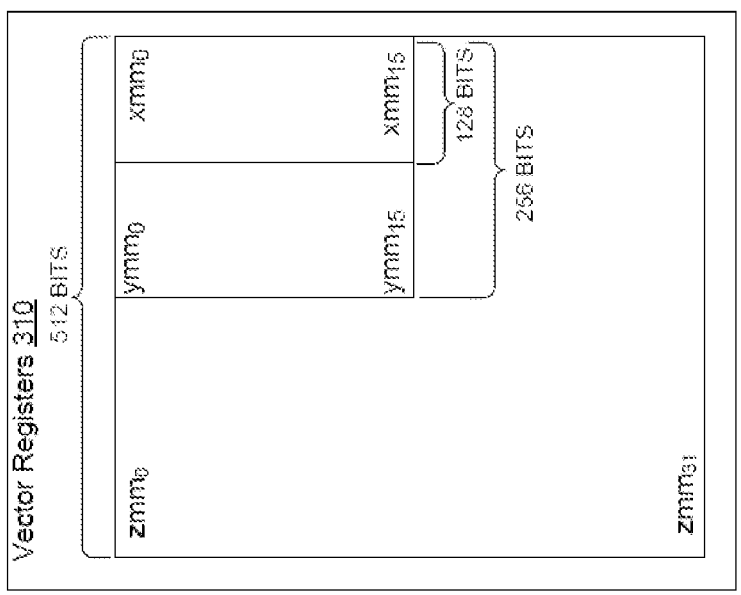

APPARATUS AND METHOD FOR POWER VIRUS PROTECTION IN A PROCESSOR

CROSS-REFERENCE TO RELATED APPLICATIONS

This application is a continuation of application Ser. No. 16/728,843, filed Dec. 27, 2019, which is hereby incorporated by reference.

TECHNICAL FIELD

The embodiments of the invention relate generally to the field of computer processors. More particularly, the embodiments relate to an apparatus and method for power virus protection in a processor.

BACKGROUND ART

A computer system may comprise a processor, which may include a core area and a region external to the core area (sometimes referred to as the "uncore" region). The core area may include one or more processing cores, caches (L1 and L2, for example), line-fill buffers and the region external to the core area may comprise last level caches, a memory controller, and such other blocks.

Processor power management techniques aim at reducing the consumption of power by the processor cores and other circuitry. In existing implementation, an activity factor in the core area may be measured and a power value (actual power consumption value) corresponding to the activity factor determined. A voltage and/or frequency operating point may then be varied based on a comparison between the actual power consumption value and an allowable power value. This power management technique may lower the voltage and/or frequency operating point after detecting that the actual power consumption value is equal to or higher than the allowable power value. However, a specific amount of time would be incurred between the point at which the high activity is detected and the point at which the voltage and/or frequency operating point is actually lowered. In between these two points, the computer system may operate in high power state and high activity state as well. To avoid such a situation, the processor (or the part) has to be binned at a lower voltage and frequency point (V/F) point.

In another prior approach, the voltage and/or frequency operating points may be selected based on the processor power saving (P) states and boost modes, which may modulate the voltage and/or frequency operating points based on the actual power consumed value. The above approaches rely on voltage operation range to increase or decrease the power and performance through frequency. With each new generation of processors, the voltage range is reduced as VCCmax is lowered for gate-oxide reliability while VCCmin remains almost constant. The above approaches are reactive in nature to the over power condition. The power management techniques discussed above respond only after the processor has reached a high thermal or power state. As a result, the time taken (or latency) to actually change the voltage and/or frequency operating point in response to a change in the thermal or power state is substantial and there is a need to reduce the latency.

In addition, the region external to the core areas in modern processors may include many functional and logical blocks such as memory controllers, last level caches, home agents, routing agents, caching agents, power control units, and interfaces, and may typically operate on a different power plane than that of the core area. Desirably, these processors need to consume low idle power, for example, to reduce the total energy consumed and/or improving the battery life. However, the power consumed by larger regions external to the cores has reached considerable levels (close to 50% of the total power consumed by the processor).

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
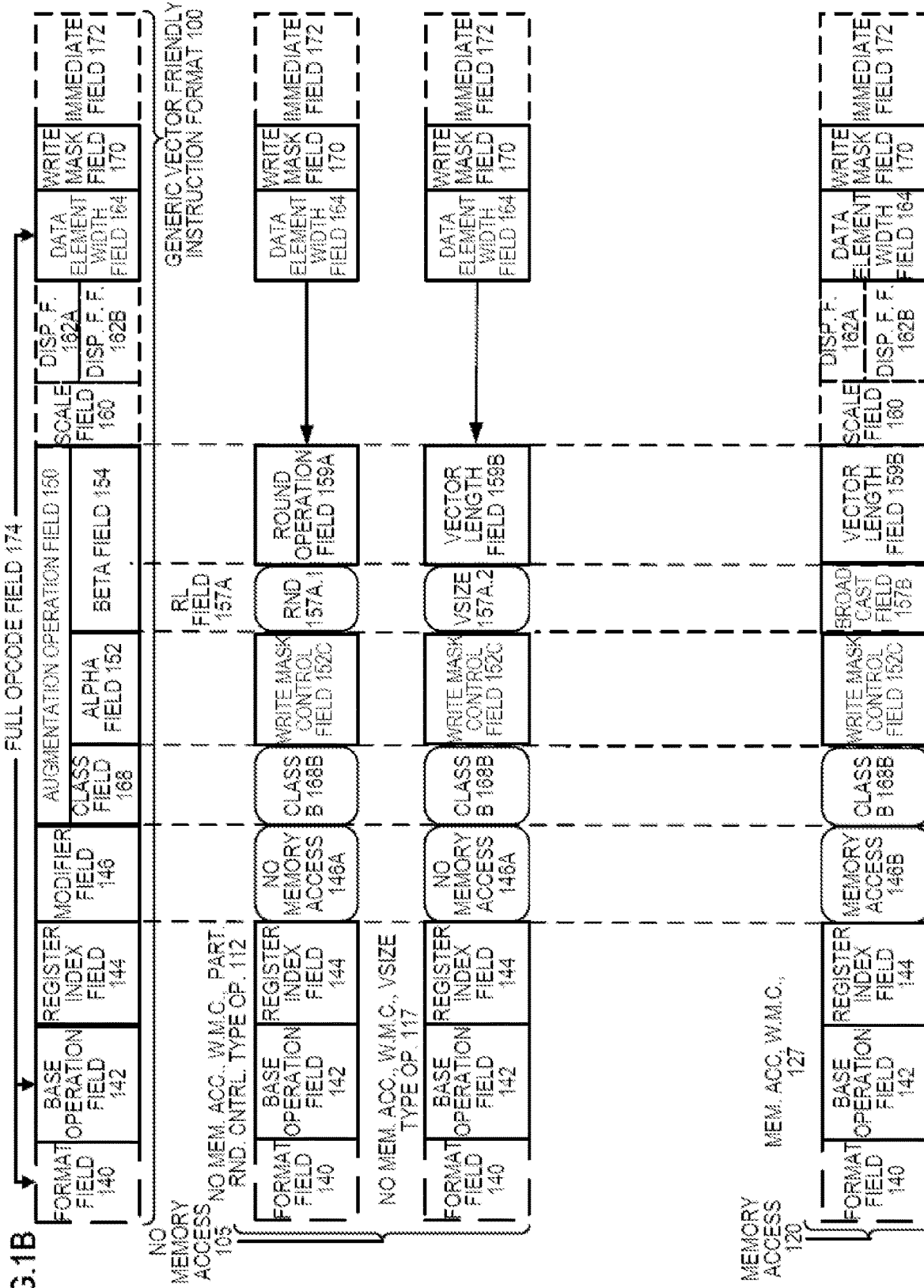

Figures IA-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}$*index+base).

Displacement Field 162A— its content is used as part of memory address generation (e.g., for address generation that uses $2^{scale}$*index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)— where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A— just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4A:
FIG. 4A is a block diagram illustrating both an exemplary in-order fetch, decode, retire pipeline and an exemplary register renaming, out-of-order issue/execution pipeline according to embodiments of the invention.
Figure 4B:
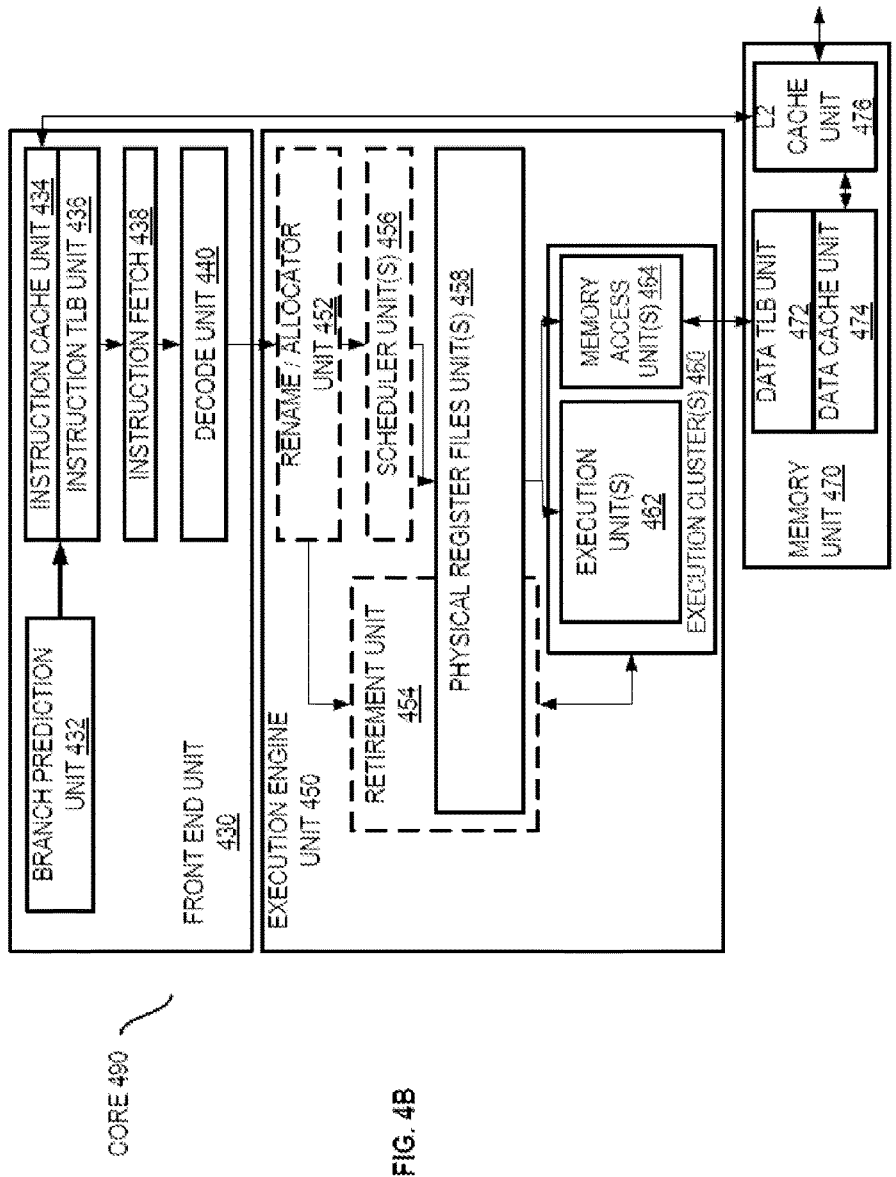
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/ execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2, Advanced Matrix Extensions (AMX) and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
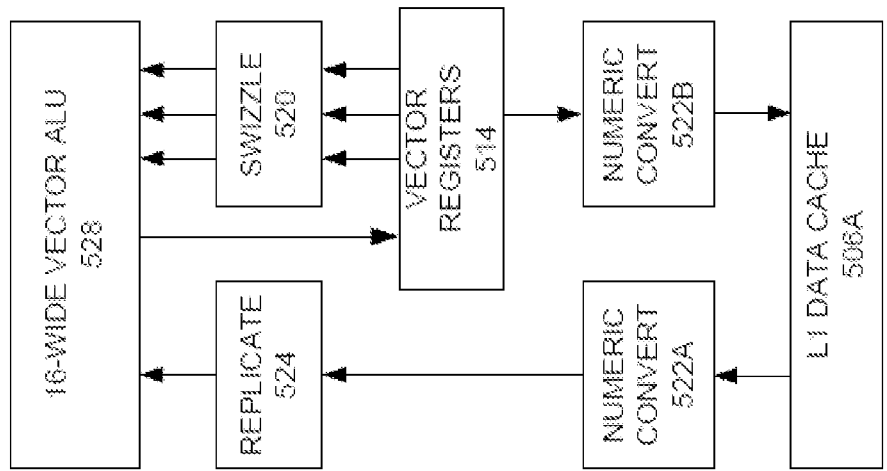
FIG. 5B illustrates an expanded view of part of the processor core in FIG. 5A according to embodiments of the invention.
Figure 5A:
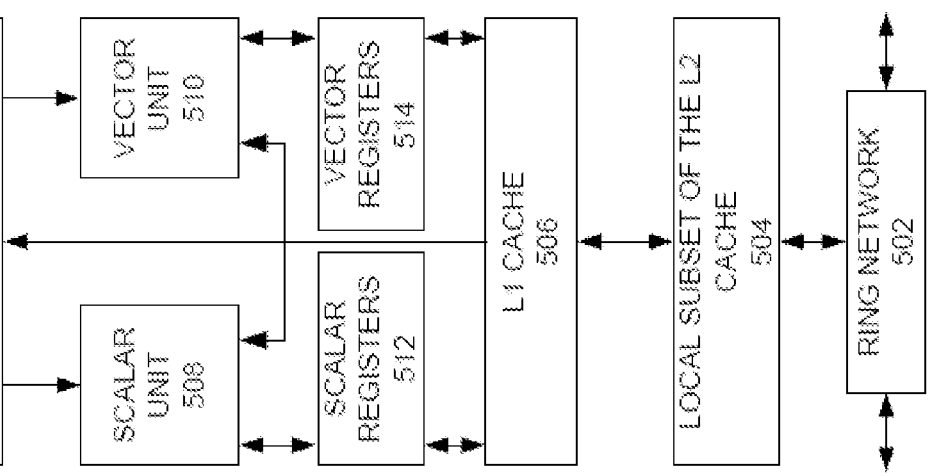
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
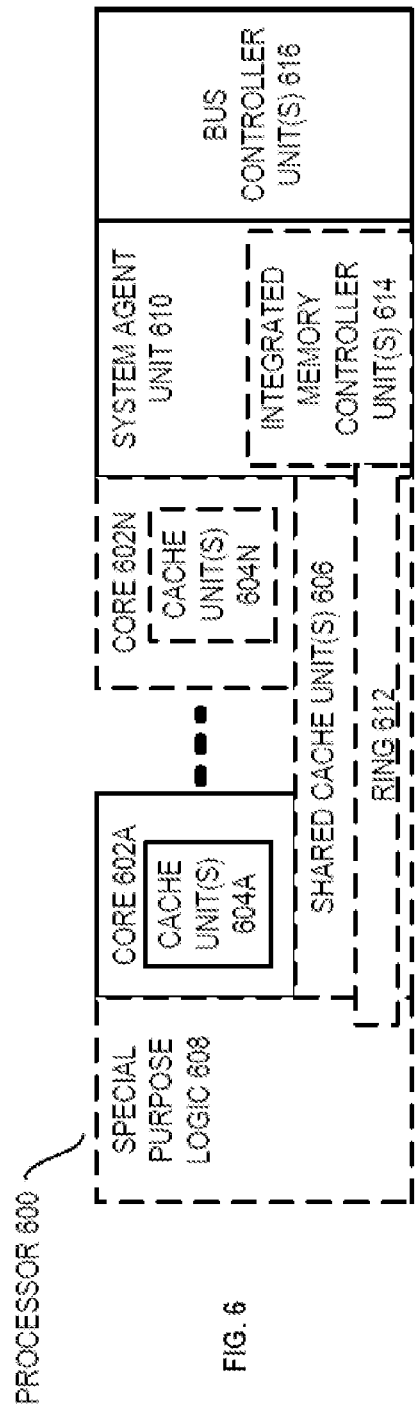
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
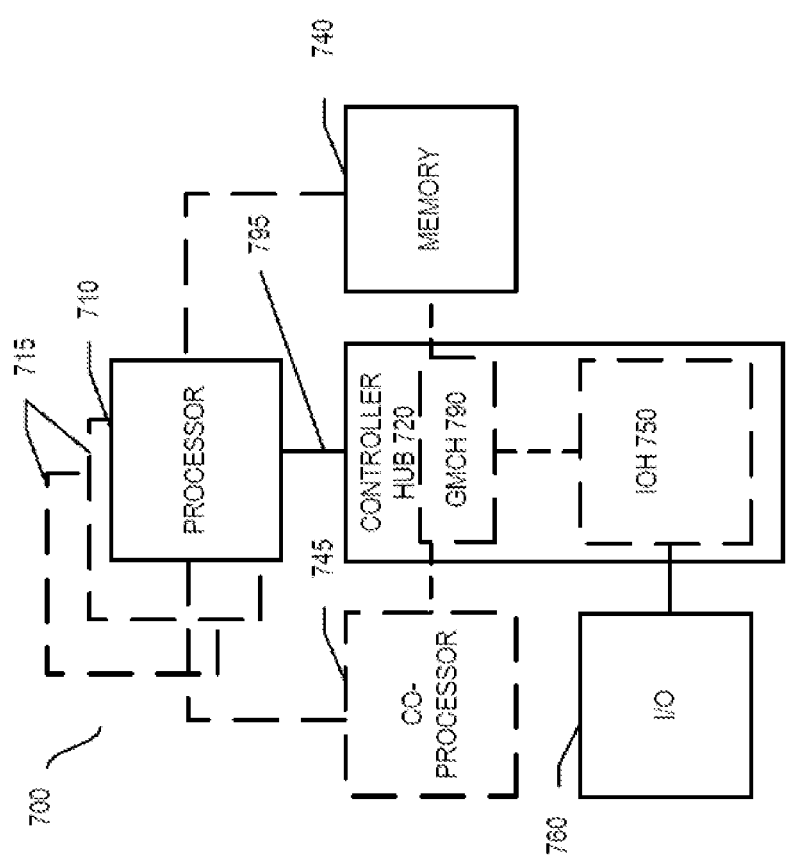
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
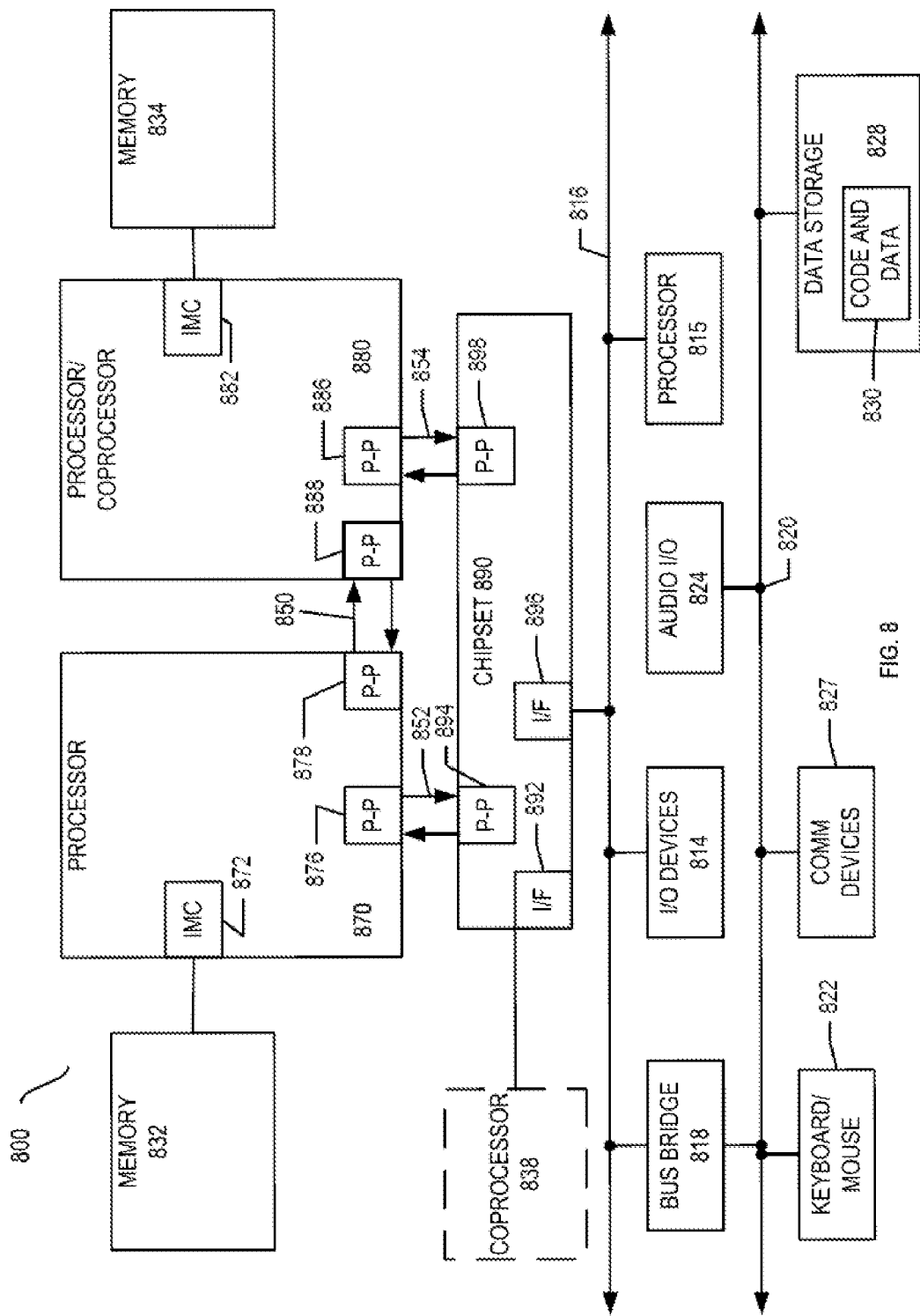
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
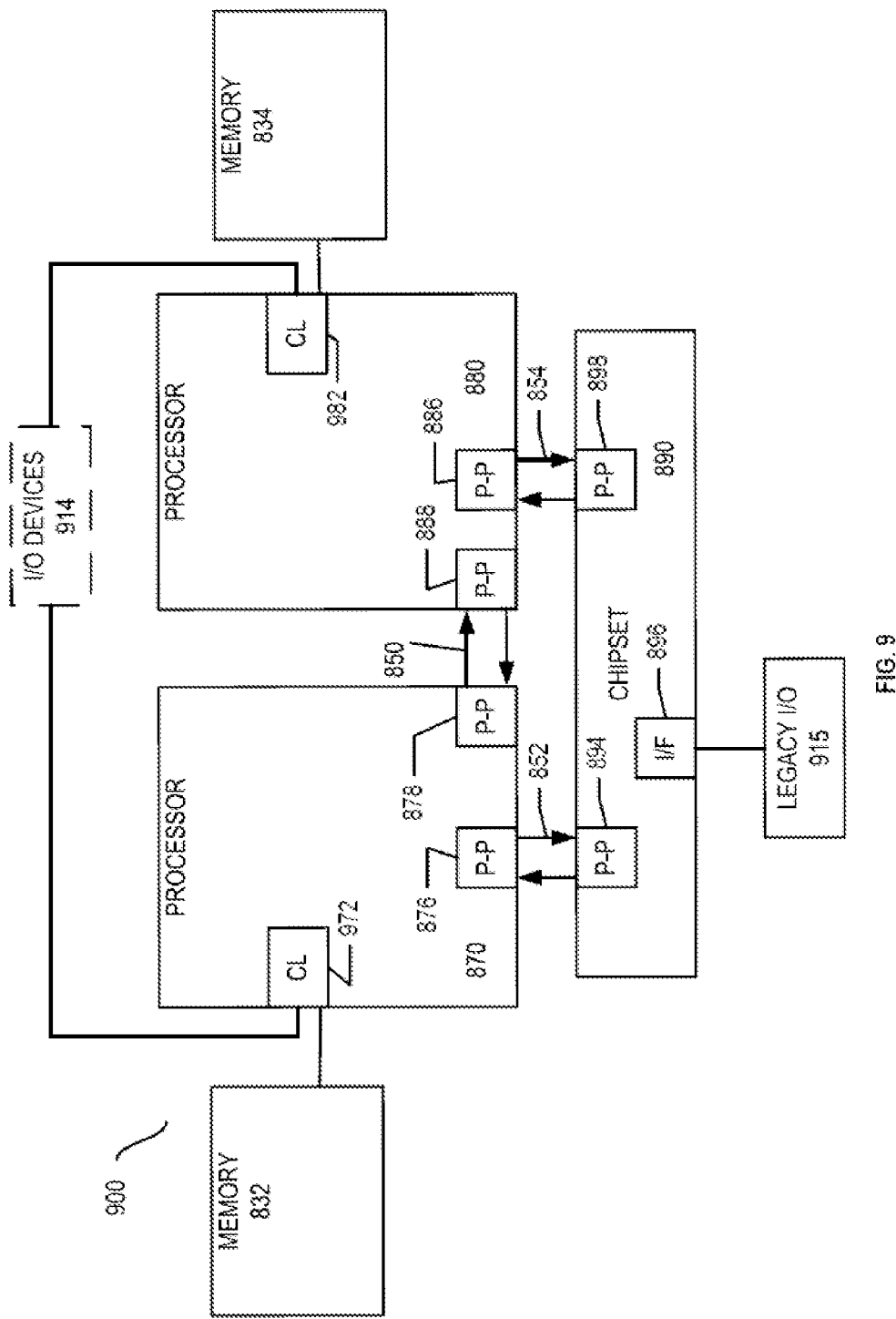
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
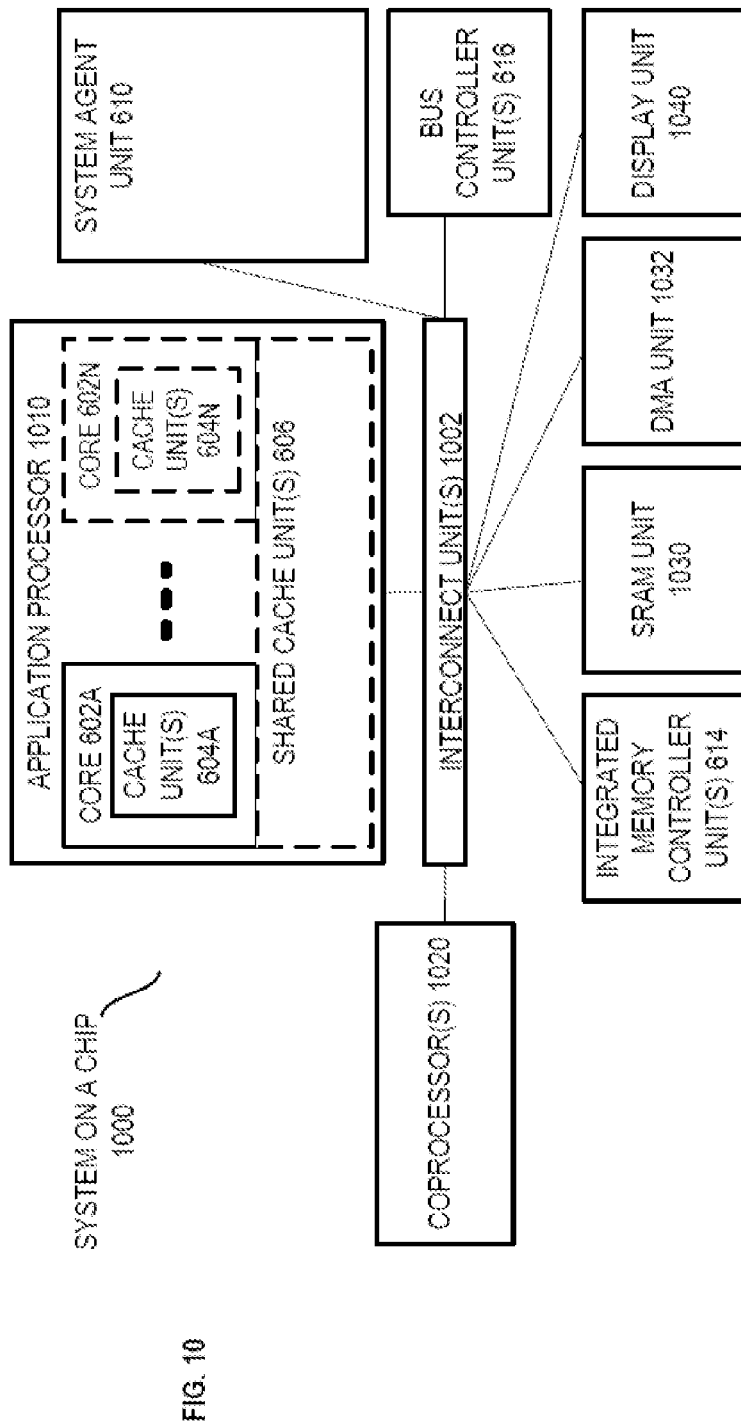
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation Including Binary Translation and Code Morphing

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
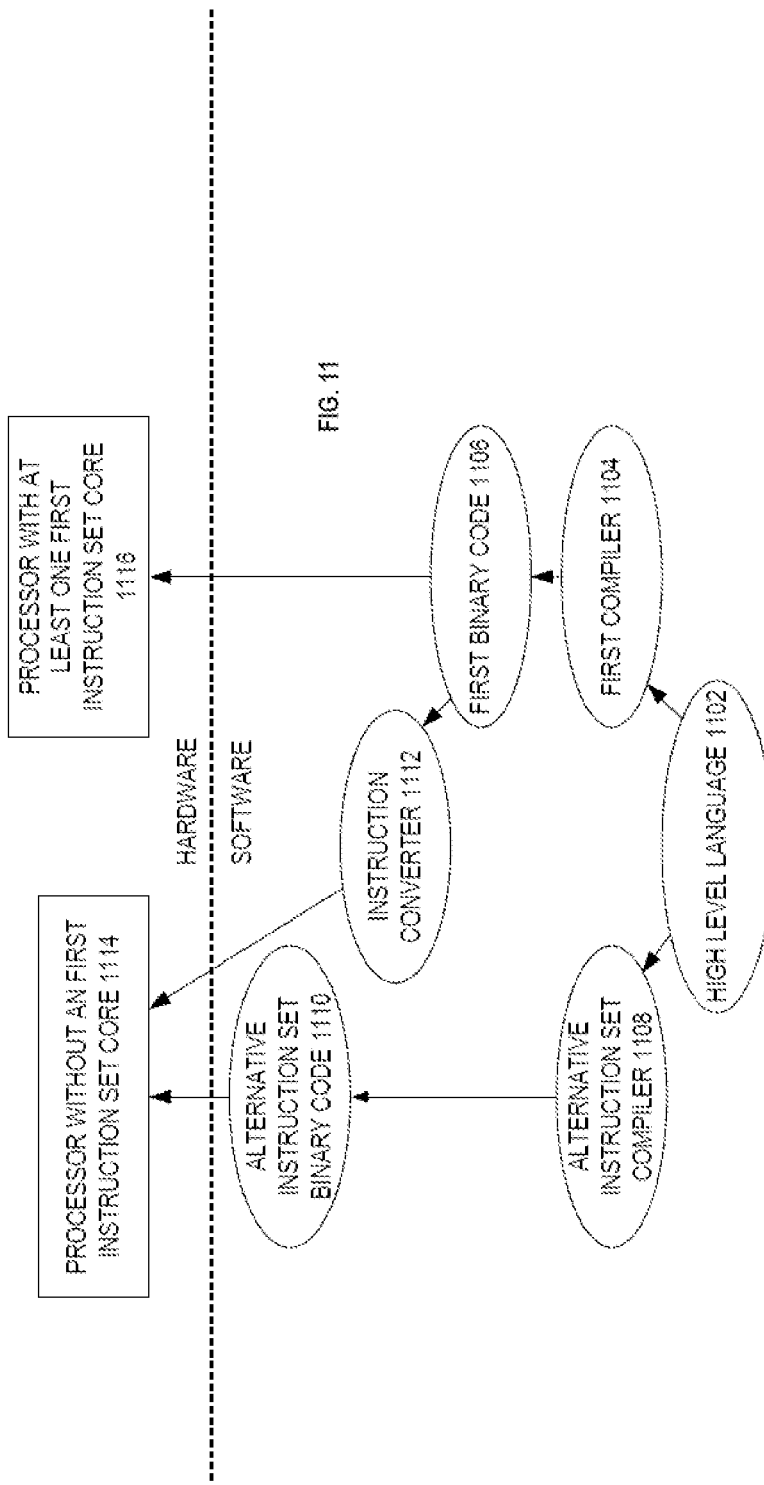
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, CA and/or that execute the ARM instruction set of ARM Holdings of Sunnyvale, CA). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Apparatus and Method for Power Virus Protection in a Processor

Processors may include a plurality of voltage regulators which are limited in the maximum current they can supply, and in the number of fast current spikes they can handle. To withstand these limitations, expensive voltage regulators may be used and/or voltage/frequency guard-bands may be added, each of which may result in a less attractive product.

A worst case condition may be modeled by a maximal theoretical power consumption scenario, referred to as a "Power Virus", which consumes power far in excess of the power typically required by other applications. The worst case condition can cause an extreme slowdown and can be potentially destructive to the processor.

Existing power virus protection (PVP) mechanisms set a single threshold that activate the protector regardless of the frequency at which the circuit is being run. In addition, existing PVP implementations use thresholds which are the same for all widths of uops (integer, SSE, AVX2, AVX3, TMUL, etc.).

In contrast, embodiments of the invention enable PVP only for frequencies which require such protection. In these implementations, PVP is disabled at low frequencies as there is no need for protection due to the low impact on current. Because PVP is enabled on a sub-range of frequencies, the performance hit by PVP is lower than existing architectures. In addition, rather than using the same threshold, embodiments of the invention set thresholds based on instruction type and/or instruction width. In these embodiments, the power virus protector is optimized for each individual instruction type/width. For example, one embodiment assigns different weights for microoperations of different widths such as 64b, 128b, and 512b.

Figure 12:
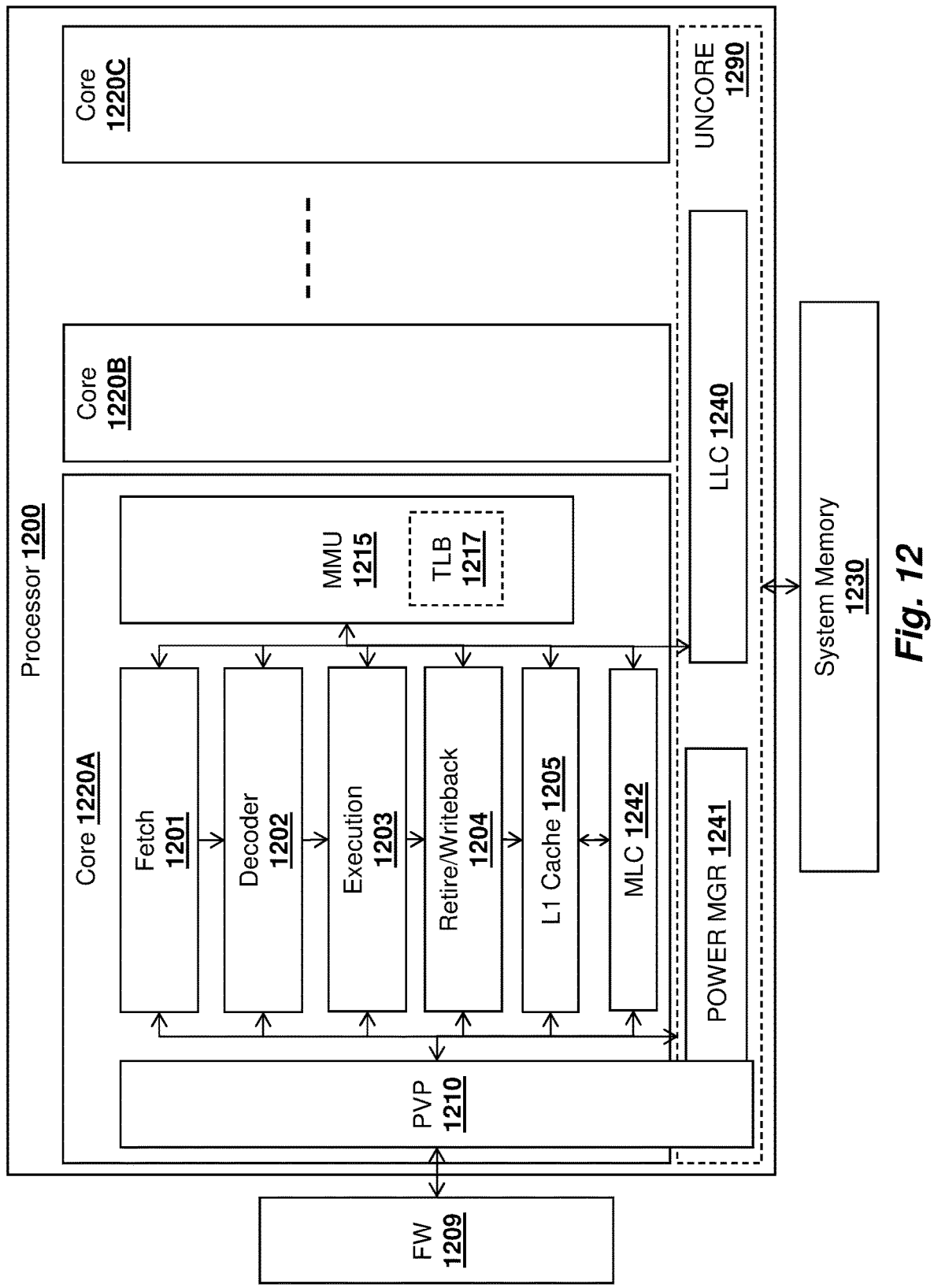
FIG. 12 illustrates an architecture on which embodiments of the invention may be implemented.

FIG. 12 illustrates an exemplary processor 1200 on which the embodiments of the invention may be implemented. In this implementation, power virus protection (PVP) circuitry 1210 within each core 1220A-C and the region 1290 external to the cores ("uncore region") tracks instruction execution and responsively adjusts the power virus response. While details of a single core 1220A are illustrated (core 1220A), the remaining cores 1220B-C may be similarly or identically configured. As discussed below, the portion of the PVP circuitry 1210 implement in the uncore region 1290 may be included within the processor power manager 1241.

The illustrated instruction pipeline includes instruction fetch circuitry 1201 for fetching instructions from memory 1230 or cache (e.g., L1 cache 1205, mid-level cache (MLC) 1242, or last-level cache (LLC) 1240) and a decoder 1202 for decoding the instructions into microoperations (uops). An execution circuit 1203 executes the microoperations and retirement/writeback circuitry 1204 commits the results of the microoperations to the current architectural state (or initiates a roll-back to a prior state if an exception is detected). As described below, the PVP circuitry 1210 may operate in response to operations at various levels of the pipeline including, but not limited to, the execution circuitry 1203, decoder 1202, and instruction fetch circuitry 1201.

A memory management unit (MMU) 1215 manages access to system memory 1230, performing virtual-to-physical address translations on behalf of executed instructions. A translation lookaside buffer 1217 caches address translations so they are available for subsequent requests.

One embodiment of the PVP circuitry/logic 1210 provides feedback to firmware (FW) 1209 regarding how frequently throttling should be performed to optimize performance. For example, if a high performance/heavy application is running, existing PVP implementations reduce performance by approximately 50%. With the feedback mechanism described herein, firmware can reduce frequency by approximately 15% and disable PVP, resulting in comparable current reduction while reducing the performance hit. Thus, embodiments of the PVP described herein allow larger dynamic capacitance (Cdyn) savings with a lower performance reduction.

In some embodiments, the PVP circuitry/logic 1210 may use one or more counters or other techniques such as a "sliding window" to track specific micro-architecture events (e.g., the number of specific types of microoperations) during specified intervals of time. The specific microoperations to be monitored may be associated with current transients that can affect processor reliability. If an activity level exceeds a predefined threshold during a given interval, the activity level may be stalled until the end of the interval.

In addition, the PVP logic 1210 may track the execution of vector source read and write operations and L1 cache 1205 or MLC 1242 loads or stores. In an embodiment, the sliding window counts accesses to the L1 cache 1205 and/or MLC 1242 over the specified intervals. For example, a change in the contents of a first-in-first-out (FIFO) buffer coupled to the L1 cache 1205 or MLC 1242 may be determined for a sliding temporal window and may be compared with one or more thresholds. An outcome of the comparison may be used, alone or in combination with PVP circuitry 1210 operations to determine whether to modify voltage/frequency and/or stall dispatches of additional operations.

One or more of the list of events below are counted in accordance with the embodiments of the invention. These events include out-of-order pipeline events from the out-of-order portion of the instruction processing pipeline (e.g., the execution circuitry 1203 and associated circuitry), front end events occurring in the in-order front end of the pipeline (e.g., the fetch circuitry 1201 and/or decoder 1202), and cache events including MLC 1242 and L1 cache 1205 events.

1. Out of Order Pipeline Events
    i. Fused Multiply-Accumulate (FMA) Operations Including Width Scale
    ii. Single instruction multiple data (SIMD) operations including width scale
    iii. Load and store operations including width scale
    iv. Any other dispatches with minimum waits
    v. FMA ADD operations including width scale
    vi. FAST ADDER operations including width scale
    vii. Half-precision floating point (FP16) operations including width scale
    viii. Matrix multiplication instructions such as TMUL which performs elementwise multiplication of the elements of two matrices.
2. Front-end Events
    i. MITE awake (i.e., instructions or microoperations utilizing the legacy decode pipeline)
    ii. Instruction decode queue (IDQ) read (i.e., reading a microoperation from the IDQ)
    iii. BPNID
    iv. DSBQREAD
    v. BPQREAD 3. MLC events
   i. MLC 1242 demand hits (i.e., memory reads which hit the MLC 1242)
   ii. MLC replacement (i.e., MLC cache lines replaced with new cache lines)

As mentioned, the PVP circuitry 1210 of one embodiment assigns a weight to each event based on event type and/or event width. Additionally, in response to an indication of single thread, the PVP circuitry 1210 subtracts a specified amount from all cycle weights.

In one embodiment, the PVP circuitry 1210 sums all events multiplied by width (E), where $$E = \text{Cycle Energy Cost}$$
$$= (\text{Events Energy Cost} - \text{Single Thread Energy Cost})$$

The sliding window energy cost is then determined by:

$$\Sigma_{last\ Cycle}^{Last\ Cycle+Sliding\ window\ depth} E = \Sigma_{last\ Cycle-1}^{Last\ cycle-1+Sliding\ window\ depth} E - \Sigma_{last\ cycle-1+sliding\ window} + E_{last\ cycle}$$

Comparing the returned sliding window value with the threshold may be used to determine how to dynamically adjust power virus protection mechanisms.

Figure 13A:
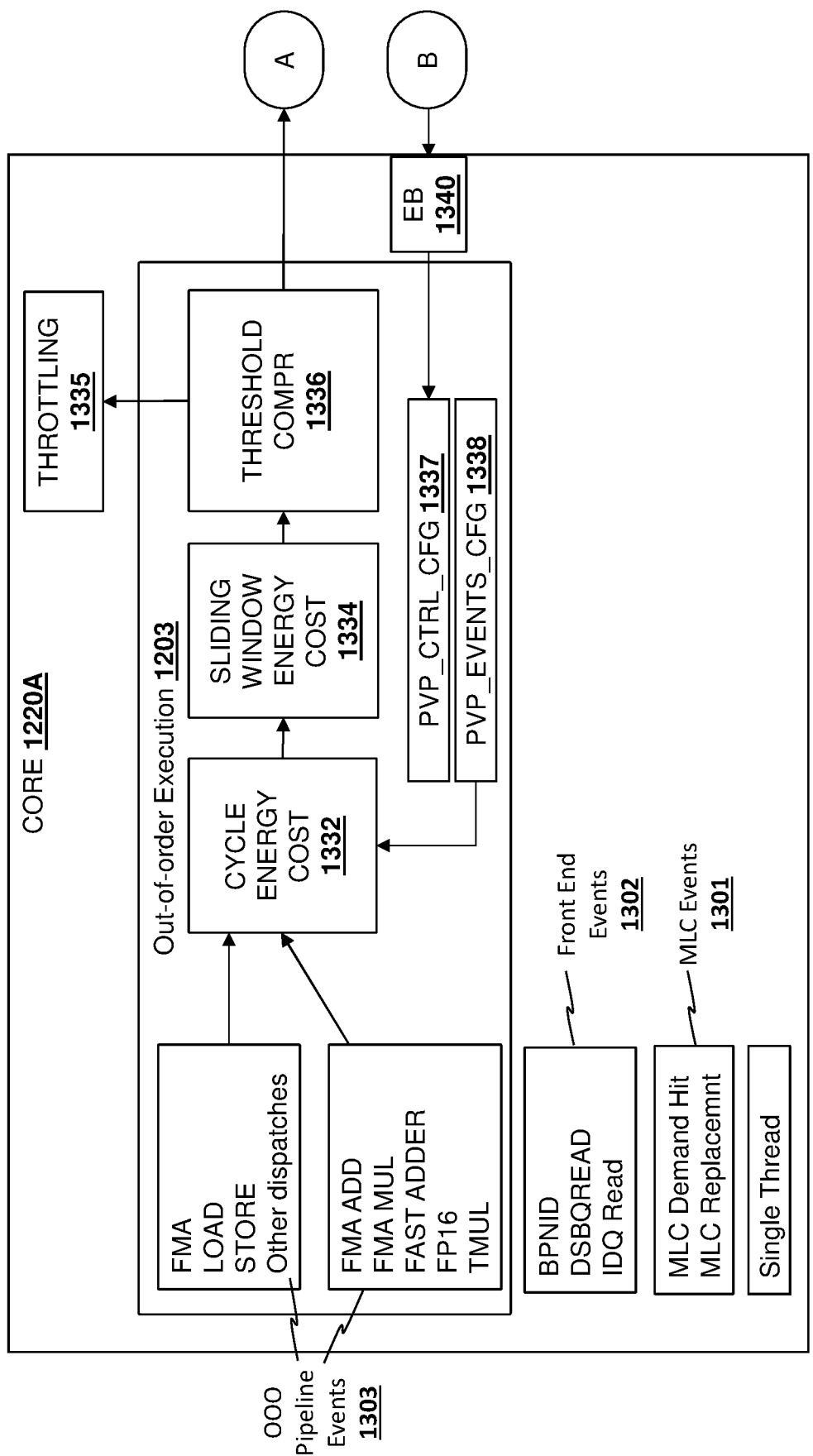
FIGS. 13A-B illustrate additional details of one embodiment of the invention.
Figure 13B:
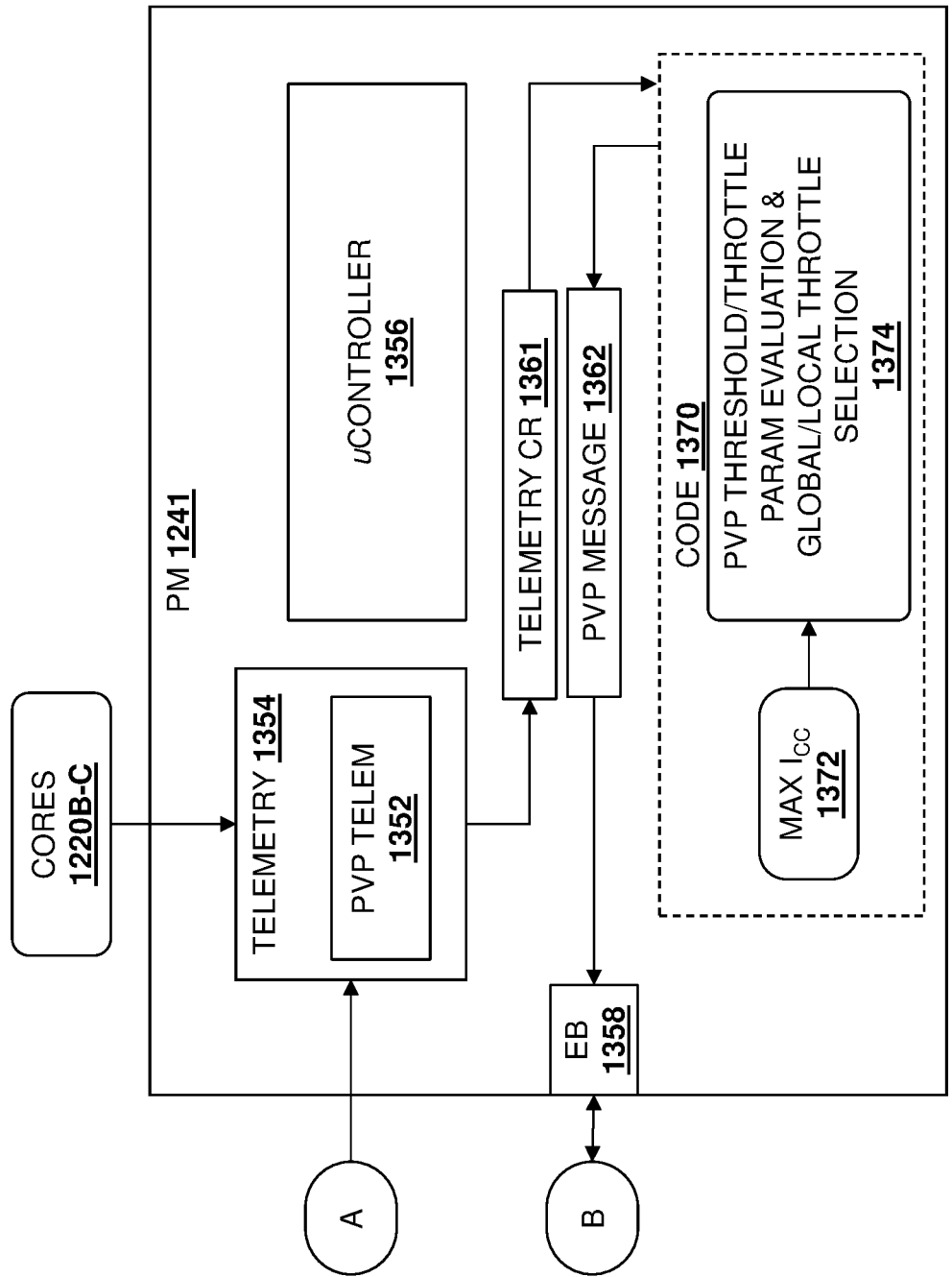

FIGS. 13A-B illustrate additional details for one embodiment of the invention. FIG. 13A illustrates operations performed within a core 1220A when tracking MLC events 1301, front end events 1302, and out-of-order pipeline events 1303 (e.g., within out-of-order execution circuitry 1203). Cycle energy cost circuitry/logic 1332 determines a per-cycle energy cost based on the particular set of events 1301-1303 processed in that cycle. A power virus protection event configuration register 1338 may be programmed to indicate the specific events to be tracked. Sliding window energy cost circuitry/logic 1334 determines the energy cost within each designated window of time and a threshold comparator 1336 determines whether the energy cost for the time window has exceeded a threshold. If so, it may trigger throttling operations 1335 (e.g., to reduce the load on the pipeline).

Referring to FIG. 13B, in one embodiment, the threshold comparator 1336 transmits a telemetry message to the power manager 1341 containing event tracking data potentially including an indication that a threshold has been exceeded. Telemetry circuitry/logic 1354 of the PM 1241 includes a power virus protection telemetry component 1352 which evaluates the data provided from the core 1220A in combination with data provided from other cores 1220B-C and responsively updates one or more telemetry control registers 1361. In one embodiment, the PVP telemetry component 1352 includes one or more counters to count threshold events (and other events) provided by the cores 1220A-C. A 20-bit counter is used in one embodiment, but the underlying principles of the invention are not limited to any particular counter size.

In one embodiment, a code sequence 1370 executed by a power manager microcontroller 1356 executes power virus control code 1370 to perform processor-wide evaluation and control of the various cores 1220A-C and uncore region 1290. In particular, one embodiment of the power virus code 1370 performs power virus threshold/throttling parameter evaluation based on data read from the telemetry control register 1361 and a specified maximum $I_{cc}$ value 1372. Based on this evaluation, it generates global and/or local throttling parameters for the processor 1200 and/or cores 1220A-C, respectively.

The code sequence 1370 may be firmware microcode, although the underlying principles of the invention are not limited to this implementation. Other embodiments may implement the same functionality in hardware or via a combination of hardware and software.

The throttling selections are provided to the various cores 1330A-C and uncore region 1290 via one or more power virus protection messages 1362, which may initially be queued in the PM 1341 and transmitted over an event bus 1358 (e.g., a parallel event bus) to the various destinations. For example, in FIG. 13A, core 1220A receives its throttling selections over a serial event bus (EB) 1340 and stores the throttling selections in a power virus protection control configuration register 1337 in the out-of-order execution circuitry 1203. Other stages of the pipeline such as the front end and other regions of the core such as the mid-level cache 1242 may also have control registers associated therewith to store throttling selections. Alternatively, a single control configuration register 1337 may be used to store all per-core throttling selections.

In one embodiment, the throttling selections indicate throttling to be performed based on the type and/or width of the instructions being executed. The out-of-order execution circuitry 1203 will then apply the throttling selections in accordance with the particular instructions or microinstructions being processed.

In one embodiment, the code sequence 1370, when executed by the controller 1356, performs a repeated periodic sequence of evaluations related to power virus protection. For example, every 1 ms, the performance impact related to power virus protection is evaluated and a determination is made based on the evaluation as to whether power virus protection state should be modified. If so, these modifications are transmitted to the cores 1220A-C and other processor components via the PVP messages 1362.

In one embodiment, to determine the power virus protection performance impact, PVP throttling telemetry data and C0 cycles telemetry data received from the cores (e.g., stored in PVP telemetry component 1352) is evaluated in combination with the maximum Icc 1372. In one specific implementation, the PVP throttling value is divided by C0 cycles from the same sliding window to generate a result which represents the worst case performance impact (e.g., a bubble insertion will delay a uop to next cycle and may issue more next cycle).

In one embodiment, a moving average is calculated over the last 10 ms. The results are then evaluated to determine whether the PVP state needs to be changed. If so, the change is transmitted via PVP messages 1362 to the cores 1330A-C and other processor components.

In one embodiment, the threshold may be different for each IccP license. For example, 512b operations may require voltage/frequency compensations while Icc Max may be determined based on a 256b operations.

A PVP control register (e.g., PVP control configuration register 1337) may be programmed with data fields as indicated in Table A below. As illustrated, different thresholds may be programmed for instructions or microoperations of different widths including 64b, 128b, 256b, and 512b. In addition, TMUL instructions which perform matrix multiplications are provided with a separate threshold designation.

TABLE A

| Type | Width |
| --- | --- |
| 64b_threshold | [8:0] |
| 128b_threshold | [8:0] |
| 256b_threshold | [8:0] |
| 512b_threshold | [8:0] |
| TMUL_threshold | [8:0] |

It should be noted, however, that these specific details are provided for the purpose of explanation. The underlying principles of the invention may be implemented using various other/additional values.

Figure 14:
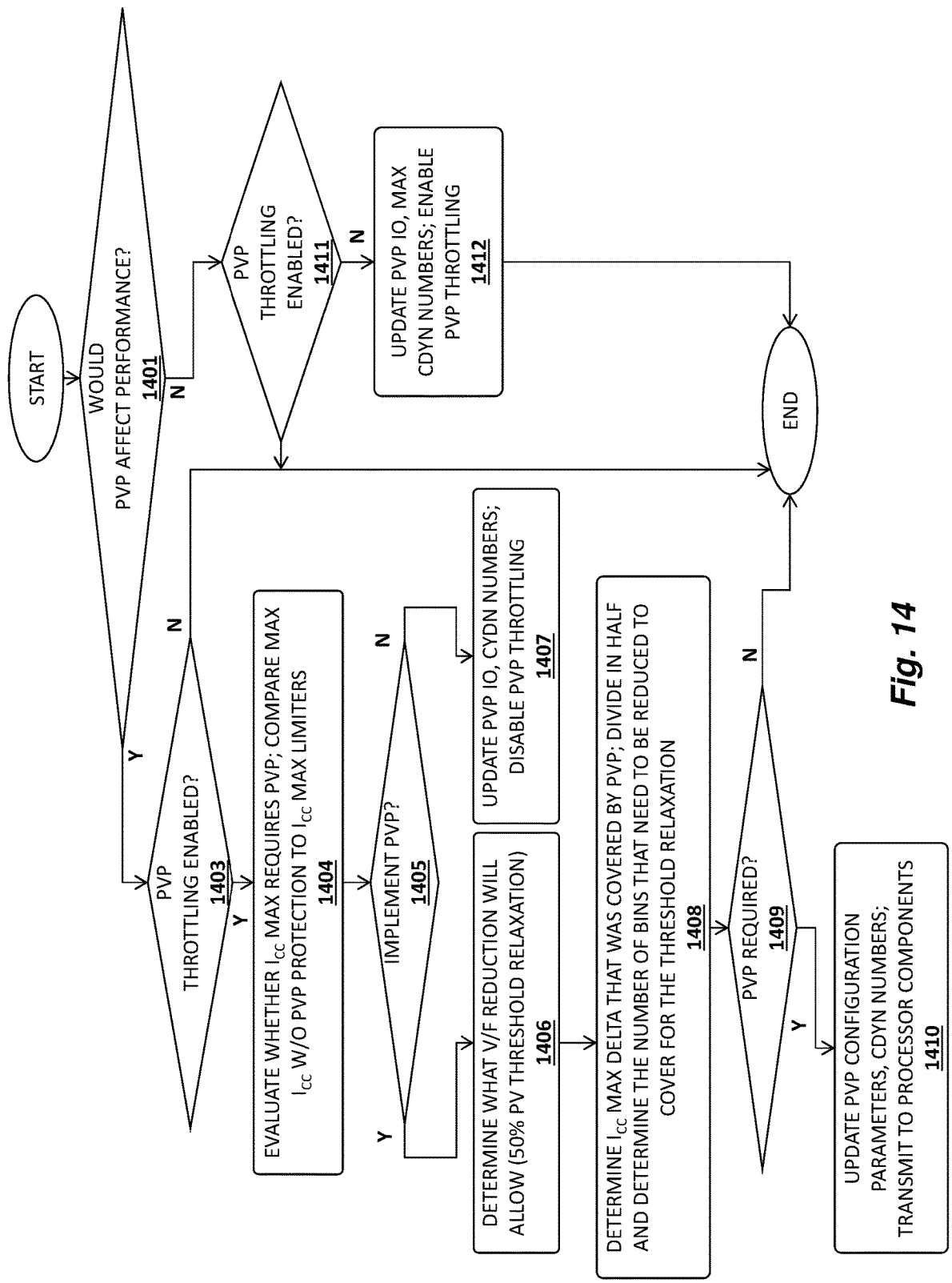
FIG. 14 illustrates a method in accordance with one embodiment of the invention.

A method in accordance with one embodiment of the invention is illustrated in FIG. 14. The method may be implemented on the various architectures described above, but is not limited to any specific architecture.

If power virus protection (PVP) would not affect performance, determined at 1401, then a determination is made as to whether PVP throttling is enabled at 1411. If not, it is enabled at 1412, updating the PVP configuration parameters such as PVP IO and maximum Cdyn values.

If PVP would affect performance, then at 1403 a determination is made as to whether PVP throttling is enabled. If not, then the process ends. If so, then at 1404 an evaluation is performed of Icc Max, comparing Icc Max with and without PVP protection (e.g., without PVP and with Max limiters). Based on the results of the evaluation, a determination is made at 1405 as to whether PVP should be implemented.

If not, then at 1407, PVP throttling is disabled, updating the Cdyn numbers and PVP configuration parameters (e.g., PVP IO). If so, then at 1406, an evaluation is performed to determine what voltage/frequency reduction will allow (e.g., a 50% power virus threshold relaxation). As indicated at 1408, this may also involve determining the Icc max delta that was covered by power virus protection. This amount is divided in half to calculate the number of bins that need to be reduced to cover for the threshold relaxation (e.g., for the worst Icc Max scenario).

Based on the above analysis, at 1409 a determination is made as to whether PVP is required. If not, the process ends. If so, then at 1410, a new set of PVP parameters are updated, including Cdyn numbers and thresholds. These results are then distributed to the various processor components (e.g., cores, uncore region) via the event bus 1358 and updated in one or more PVP control configuration registers 1337.

In one implementation, the PVP control configuration register 1337 will include a PVP disable bit which, when set, indicates that PVP throttling is disabled. In addition, a set of 9-bits indicate a threshold value to be applied for PVP. In one embodiment, each time a core is granted a license, the PVP control configuration register 1337 is updated with new configuration data.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

EXAMPLES

The following are example implementations of different embodiments of the invention.

Example 1. A processor comprising: first circuitry including an instruction fetch circuit to fetch instructions, each instruction comprising an instruction type and an associated width comprising a number of bits associated with source and/or destination operand values associated with the instruction; detection circuitry to detect one or more instructions of a particular type and/or width; evaluation circuitry to evaluate an impact of power virus protection (PVP) circuitry when executing the one or more instructions based on the detected instruction types and/or widths; and control circuitry, based on the evaluation, to configure the PVP circuitry in accordance with the evaluation performed by the evaluation circuitry.

Example 2. The processor of example 1 wherein the evaluation circuitry is to compare one or more variables related to execution of the one or more instructions with and without the PVP circuitry being enabled.

Example 3. The processor of example 2 wherein responsive to the evaluation performed by the evaluation circuitry, the control circuitry is to disable the PVP circuitry or modify a configuration of the PVP circuitry.

Example 4. The processor of example 1 wherein the evaluation circuitry is to assign weights to the one or more instructions and to use the weights to perform the evaluation.

Example 5. The processor of example 3 wherein instructions having different widths are to be assigned different weights.

Example 6. The processor of example 1 further comprising: execution circuitry to execute the one or more instructions, and wherein the PVP circuitry is to apply power virus protection during the execution in accordance with the configuration performed by the control circuitry.

Example 7. The processor of example 6 further comprising: a plurality of cores to process a plurality of threads, a first core to include the instruction fetch circuitry and the execution circuitry; and a power manager comprising the evaluation circuitry to evaluate the impact of the PVP circuitry based on data received from the plurality of cores to generate a PVP configuration result, the power manager to transmit the PVP configuration result to the plurality of cores over an interconnect.

Example 8. The processor of example 7 wherein each core of the plurality of cores comprises at least a portion of the control circuitry to configure the PVP circuitry based on the PVP configuration result.

Example 9. The processor of example 8 wherein the data received from the plurality of cores comprises PVP threshold and/or throttling parameters and wherein the evaluation circuitry is to generate the PVP configuration result in accordance with a specified maximum current value.

Example 10. The processor of example 7 wherein detection circuitry of each core of the plurality of cores comprises: sliding window energy cost circuitry/logic to determine at least one energy cost value associated with a specified periodic time window; and a threshold comparator to determine whether an energy cost value is beyond a specified threshold and, if so, to transmit an indication of the energy cost value being beyond the threshold to the power manager.

Example 11. A method comprising: fetching instructions, each instruction comprising an instruction type and an associated width comprising a number of bits associated with source and/or destination operand values associated with the instruction; detecting one or more instructions of a particular type and/or width; evaluating an impact of power virus protection (PVP) when executing the one or more instructions based on the detected instruction types and/or widths; and configuring PVP circuitry in accordance with the evaluation performed by the evaluation circuitry.

Example 12. The method of example 11 wherein evaluating comprises comparing one or more variables related to execution of the one or more instructions with and without the PVP circuitry being enabled.

Example 13. The method of example 12 wherein configuring comprises disabling the PVP circuitry or modifying a configuration of the PVP circuitry.

Example 14. The method of example 11 wherein evaluating comprises assigning weights to the one or more instructions and using the weights to perform the evaluation.

Example 15. The method of example 13 wherein instructions having different widths are to be assigned different weights.

Example 16. The method of example 11 further comprising: executing the one or more instructions, and applying power virus protection during the execution in accordance with configuring the PVP circuitry.

Example 17. The method of example 16 wherein the operations of fetching and executing are performed on a first core of a plurality of cores, the method further comprising: processing a plurality of threads on the plurality of cores, wherein the evaluating is performed on a power manager to evaluate the impact of the PVP circuitry based on data received from the plurality of cores to generate a PVP configuration result, the power manager to transmit the PVP configuration result to the plurality of cores over an interconnect.

Example 18. The method of example 17 wherein each core of the plurality of cores comprises at least a portion of the configuring of the PVP circuitry based on the PVP configuration result.

Example 19. The method of example 18 wherein the data received from the plurality of cores comprises PVP threshold and/or throttling parameters and wherein the evaluation circuitry is to generate the PVP configuration result in accordance with a specified maximum current value.

Example 20. The method of example 17 wherein detecting further comprises: determining at least one energy cost value associated with a specified periodic time window; and determining that an energy cost value is beyond a specified threshold; and transmitting an indication of the energy cost value being beyond the threshold to the power manager.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a set of processor cores; and
circuitry to throttle the set of processor cores for power virus protection (PVP), wherein throttling a processor core of the set of processor cores comprises:
evaluating an impact of the circuitry on performance of the processor core to determine whether to enable the circuitry, wherein upon being enabled, the circuitry is to determine whether to trigger one or more throttling operations when executing one or more instructions on the processor core based on instruction types and/or widths of the one or more instructions, and
configuring the circuitry in accordance with the evaluation.

2. The processor of claim 1, further comprising a last-level cache, wherein the circuitry is to throttle the last-level cache along with the processor core in accordance with the evaluation.

3. The processor of claim 1, wherein the evaluation of the impact of the circuitry on the performance of the processor core comprises comparing the widths of the one or more instructions to their corresponding thresholds to determine whether to enable the circuitry.

4. The processor of claim 1, wherein the evaluation of the impact of the circuitry on the performance of the processor core comprises assigning different weights for instructions having different widths.

5. The processor of claim 1, wherein the evaluation of the impact of the circuitry on the performance of the processor core comprises comparing one or more variables related to execution of the one or more instructions with and without enabling the circuitry.

6. The processor of claim 1, further comprising a power manager to evaluate the impact of the circuitry based on data received from the set of cores to generate a configuration result, the power manager to transmit the configuration result to the set of cores over an interconnect.

7. The processor of claim 6, wherein the processor core is to configure the circuitry based on the configuration result.

8. The processor of claim 1, wherein throttling the processor core of the set of processor cores further comprises:
fetching instructions, each instruction comprising an instruction type and an associated width, and
detecting the instruction types and/or widths of the one or more instructions prior to evaluating the impact of the circuitry on the performance of the processor core.

9. The processor of claim 1, wherein the evaluation comprises comparing one or more variables related to execution of the one or more instructions with and without the circuitry being enabled.

10. The processor of claim 1, wherein configuring the circuitry in accordance with the evaluation comprises disablement or configuration modification of the circuitry.

11. A method comprising:
to throttling, by a circuitry of a processor, a set of processor cores of the processor for power virus protection (PVP), throttling a processor core of the set of processor cores comprising:
evaluating an impact of the circuitry on performance of the processor core to determine whether to enable the circuitry, wherein upon being enabled, the circuitry is to determine whether to trigger one or more throttling operations when executing one or more instructions on the processor core based on instruction types and/or widths of the one or more instructions, and
configuring the circuitry in accordance with the evaluation.

12. The method of claim 11, wherein the circuitry is to throttle a last-level cache along of the processor with the processor core in accordance with the evaluation.

13. The method of claim 11, wherein the evaluation of the impact of the circuitry on the performance of the processor core comprises assigning different weights for instructions having different widths.

14. The method of claim 11, wherein a power manager to evaluate the impact of the circuitry based on data received from the set of cores to generate a configuration result, the power manager to transmit the configuration result to the set of cores over an interconnect.

15. The method of claim 11, wherein configuring the circuitry in accordance with the evaluation comprises disablement or configuration modification of the circuitry.

16. A non-transitory computer-readable storage medium storing instructions that when executed by a processor of a machine, are capable of causing the machine to perform:
to throttling, by circuitry of a processor, a set of processor cores of the processor for power virus protection (PVP), throttling a processor core of the set of processor cores comprising:
evaluating an impact of the circuitry on performance of the processor core to determine whether to enable the circuitry, wherein upon being enabled, the circuitry is to determine whether to trigger one or more throttling operations when executing one or more instructions on the processor core based on instruction types and/or widths of the one or more instructions, and
configuring the circuitry in accordance with the evaluation.

17. The non-transitory computer-readable storage medium of claim 16, wherein the evaluation of the impact of the circuitry on the performance of the processor core comprises comparing the widths of the one or more instructions to their corresponding thresholds to determine whether to enable the circuitry.

18. The non-transitory computer-readable storage medium of claim 16, wherein the evaluation of the impact of the circuitry on the performance of the processor core comprises comparing one or more variables related to execution of the one or more instructions with and without enabling the circuitry.

19. The non-transitory computer-readable storage medium of claim 16, wherein throttling the processor core of the set of processor cores further comprises:
fetching instructions, each instruction comprising an instruction type and an associated width, and
detecting the instruction types and/or widths of the one or more instructions prior to evaluating the impact of the circuitry on the performance of the processor core.

20. The non-transitory computer-readable storage medium of claim 16, wherein the evaluation comprises comparing one or more variables related to execution of the one or more instructions with and without the circuitry being enabled.

* * * * *